United States Patent
Takanashi et al.

(10) Patent No.: US 6,856,438 B2
(45) Date of Patent: Feb. 15, 2005

(54) OPTICAL SCANNING LENS AND APPARATUS CAPABLE OF EFFECTIVELY GENERATING ACCURATELY-PITCHED LIGHT SPOTS, AND IMAGE FORMING APPARATUS USING THE SAME

(75) Inventors: Kenichi Takanashi, Chiba-ken (JP); Kohji Sakai, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 153 days.

(21) Appl. No.: 10/382,489

(22) Filed: Mar. 7, 2003

(65) Prior Publication Data
US 2003/0179429 A1 Sep. 25, 2003

(30) Foreign Application Priority Data
Mar. 7, 2002 (JP) ........................... 2002-062197

(51) Int. Cl.$^7$ ................................. G02B 26/08
(52) U.S. Cl. ................. 359/204; 359/652; 347/243; 347/244
(58) Field of Search ................. 359/204–207, 359/652–654; 347/233, 243, 244

(56) References Cited

U.S. PATENT DOCUMENTS

| | | | |
|---|---|---|---|
| 5,966,161 A | * 10/1999 | Kato | ............ 347/258 |
| 5,999,345 A | 12/1999 | Nakajima et al. | |
| 6,081,386 A | * 6/2000 | Hayashi et al. | ............ 359/641 |
| 6,166,842 A | 12/2000 | Aoki et al. | |
| 6,185,026 B1 | 2/2001 | Hayashi et al. | |
| 6,233,081 B1 | 5/2001 | Suzuki et al. | |
| 6,256,133 B1 | 7/2001 | Suzuki et al. | |
| 6,288,819 B1 | 9/2001 | Aoki et al. | |
| 6,317,246 B1 | 11/2001 | Hayashi et al. | |
| 6,347,004 B1 | 2/2002 | Suzuki et al. | |
| 6,348,988 B2 | 2/2002 | Aoki et al. | |
| 6,348,989 B2 | 2/2002 | Aoki et al. | |
| 6,359,717 B2 | 3/2002 | Suzuki et al. | |
| 6,366,384 B1 | 4/2002 | Aoki et al. | |
| 6,388,792 B1 | 5/2002 | Atsuumi et al. | |
| 6,400,391 B1 | 6/2002 | Suhara et al. | |
| 6,448,998 B1 | 9/2002 | Suzuki et al. | |
| 6,509,995 B1 | 1/2003 | Suzuki et al. | |
| 2001/0048542 A1 | * 12/2001 | Suhara | ............ 359/205 |
| 2001/0055140 A1 | 12/2001 | Sakai et al. | |

FOREIGN PATENT DOCUMENTS

| | | |
|---|---|---|
| JP | 09-049976 | 2/1997 |
| JP | 10-288749 | 10/1998 |
| JP | 11-002768 | 1/1999 |
| JP | 11-038314 | 2/1999 |
| JP | 11-044641 | 2/1999 |

* cited by examiner

Primary Examiner—Audrey Chang
Assistant Examiner—Denise S. Allen
(74) Attorney, Agent, or Firm—Oblon, Spivak, McClelland, Maier & Neustadt, P.C.

(57) ABSTRACT

An optical scanning lens used in a multi-beam scanning optical apparatus including a first mechanism reforming the light beams into line images, a deflecting mechanism reforming the light beams into multiple scanning beams, and a second mechanism reforming the multiple scanning beams into scanning light spots running on a recording surface. The optical scanning lens has a refractive index profile and is included in the second optical mechanism, and satisfies a formula $(m-1) \times PLs \times V/WLs \leq 2.3 \times 10^{-6}$, where m is a number of light emission points, PLs is a pitch of the multiple beams, V represents the refractive index profile, W [mm] represents an effective recording width of the recording surface, and WLs represents an effective range of the optical scanning lens in the sub-scanning direction corresponding to the effective recording width W. An optical scanning apparatus or image forming apparatus may use the optical scanning apparatus.

12 Claims, 7 Drawing Sheets

OPTICAL SCANNING LENS AND APPARATUS CAPABLE OF EFFECTIVELY GENERATING ACCURATELY-PITCHED LIGHT SPOTS, AND IMAGE FORMING APPARATUS USING THE SAME

BACKGROUND OF THE INVENTION

1. Field of the Invention

The present invention relates to an optical scanning lens and apparatus, and more particularly to an optical scanning lens and apparatus which are capable of effectively generating accurately-pitched light spots on a latent image recording surface. Further, the present invention also relates to an image forming apparatus using the above-mentioned optical scanning apparatus.

2. Discussion of the Background

Image forming apparatuses such as digital copying machines, laser printers, and laser facsimile machines form images generally by using optical scanning systems. Such an optical scanning system includes a light source having a light emission point, a first optical mechanism, a light deflecting mechanism, and a second optical mechanism. The first optical mechanism reforms the shape of the light beam emitted from the light emission point so that the light beam forms a line image extending in the main scanning direction at an area to the light deflecting mechanism. The light deflecting mechanism deflects the light beam to convert the light beam into a scanning light beam with a plurality of deflective reflection surfaces. The second optical mechanism focuses the scanning light beam into a scanning light spot on a surface to be scanned.

A multi-beam scanning optical system, also known, is capable of scanning simultaneously with multiple laser beams by using a light source that has a plurality of light emission points.

In recent years, optical elements for use in an optical scanning apparatus, such as an optical scanning lens in particular, are made of molded plastic due to a reason that a lens with a high quality non-circular surface is produced by plastic molding at a relatively low cost. In a process of plastic molding for optical elements, a plastic material melted by heat is molded with a molding tool and is cooled in the molded tool. At this time, however, a cooling speed of the plastic material is different between peripheral portions and the center portion of the plastic material. That is, the peripheral portions of the plastic material are cooled faster than the center portion thereof. As a result, the peripheral portions have a higher density than the center portion. This causes an uneven density distribution in the plastic lense, or a deformation of the lens which produces art, uneven refractive index in the plastic lens. As a consequence, a refractive index profile is generated in the plastic lens.

A refractive index profile of a background lens 50 is explained with reference to FIGS. 1A–1E. FIG. 1A is a cross-section view of the lens 50 with contour lines expressing a refractive index profile of the lens 50 seen from this view. This cross-section view is made by virtually cutting the lens 50 with a plane including a light axis and parallel to the main scanning direction. In FIG. 1A, a dotted line represents a thickness center line connecting centers of lens thickness along in the main scanning direction. FIG. 1B shows the refractive index profile of the lens 50 along the thickness center line of the lens 50 indicated by the dotted line in FIG. 1A.

FIG. 1C shows a cross-section view of the lens 50 with contour lines expressing the refractive index profile of the lens 50 seen from this view. This cross-section view is made by virtually cutting the lens 50 with a plane including the light axis and parallel to the sub-scanning direction. FIG. 1D shows the refractive index profile of the lens 50 along a thickness center line of the lens 50 of FIG. 1C. FIG. 1E shows the refractive index profile of the lens 50 along the plane including the light axis and parallel to the main scanning direction.

As shown in FIGS. 1A–1E, the refractive index inside a lens is generally higher at peripheral portions of the lens than at the center portion thereof. This is caused by the different cooling speed in the plastic molding, as described above.

When a lens for use in an optical scanning system has a refractive index profile, optical characteristics of the lens become slightly different from those as designed. This is because when the lens is designed, the refractive index inside the lens is considered to be consistent. Accordingly, an average lens has the refractive index higher at the peripheral portions thereof than at the center portion, and focuses light into a light spot at a position on a scanning surface that is slightly longer in distance from a light deflecting than the position as designed.

A diameter of the light spot running within an effective scanning area on the scanning surface, as well as an image height, vary in accordance with a curve in an image surface of the optical scanning lens. When the lens has the refractive index profile, the diameter of the light spot is also effected. FIG. 2 shows a manner in which an amount of defocus on the scanning surface is changed by the refractive index profile. In FIG. 2, the vertical axis represents a diameter of light spot and the horizontal axis represents a defocus amount, that is, a difference between an image focusing position (i.e., the light gathering position) and a position on the scanning surface. When a lens has a consistent refractive index inside the lens and has no refractive index profile, a relationship between the defocus amount and the spot diameter is made as indicated by a dotted line A in FIG. 2 in which the spot diameter becomes smaller *** on the scanning surface, that is, at a position where the defocus amount is 0. When a lens has a refractive index profile, the relationship between the defocus amount and the spot diameter is moved rightwards as indicated by a solid line B in FIG. 2. In this case, the spot diameter on the scanning surface becomes greater than the diameter as designed. Accordingly, the actual spot diameter on the scanning surface is greater than the designed spot diameter by an amount indicated by a letter C.

Moreover, a deviation of focusing position caused due to the refractive index profile is not necessarily consistent among image heights. If the deviation of focusing position is consistent among image heights, a good light spot can be made to every image height by moving a portion of the first optical mechanism in the light axis direction to correct the focusing position towards the dotted line A.

However, when a lens having a refractive index profile is used, the deviation of focusing position is not consistent among image heights. Accordingly, an adjustment of a good light spot taken for an image height may not be applicable to another image height. This becomes apparent as the light spot diameter is made small in order to increase an image quality.

Therefore, when the refractive index profile is not taken into account in designing a lens for use in an optical scanning system, the variations of the light spot diameter among the image heights become greater and degrade an image recording quality.

If a lens having the refractive index profile is used in a multi-beam scanning optical system, a pitch of the multiple beams on the scanning surface may vary among the image heights. The reason is that a horizontal scaling and a refractive direction of the image focusing in the sub-scanning direction from the light deflecting mechanism to the scanning surface are changed over each image height. When a deviation of the light spot diameter among the image heights is greater, an uneven recording image is produced. This phenomenon may become apparent as the pitch of the light spots is adjusted narrower to increase an image quality. Examples of the optical scanning apparatus are described in Japanese Laid-Open Patent Application Publications, No. 09-049976, No. 10-288749, No. 11-002768, No. 11-038314, and No. 11-04461.

The optical scanning apparatus described in Japanese Laid-Open Patent Application Publication, No. 09-049976, is configured to shorten a focal length calculated based on a curvature of a lens surface, a refractive index of a lens material, and a light-axis thickness of the lens in comparison with an actually measured focal length. This is one way to attempt to correct a deviation of image focusing position due to the refractive index profile generated through the plastic molding process.

Since the molded-plastic lens is usually produced through a mass production process, as described above, using the same material and under the same conditions, the refractive index profile is consistent among the produced lenses. Therefore, the refractive index profile of the lens can be experimentally measured. For example, a refractive index profile can be determined within an effective diameter of the lens using a formula $V \leq 15 \times 10^{-5}$, wherein V is a difference between the largest and smallest refractive indexes measured, representing an amount of the refractive index profile. Therefore, after the molding process with the molding tool, the refractive index profile is measured and is used to correct the shape of the molding tool. In this way, the deviation of the image focusing position caused by the refractive index profile can be corrected.

In correcting the shape of the plastic molding tool, an amount of correction is as preferably small as possible since a smaller correction can ensure an easy and accurate correction. However, as described in Japanese Laid-Open Patent Application Publication, No. 09-049976, an amount of correction with respect to the shape of the plastic molding tool is considerably large when the deviated image focusing position due to the refractive index profile is correctively shifted to the scanning surface by determining the curvature and associated factors of the lens such that the focal length is made shorter than the actually measured focal length over every image height. In this case, it is difficult to perform the correction with accuracy. If the deviation of the image focusing position is corrected, a value of F/W may be of the order of 0.007, wherein W is an effective recording width on the scanning surface for the light spot to run and F is an amount of deviation among the image heights with respect to the image focusing position of the light spot. However, to decrease the light spot diameter to increase an image quality, the value of F/W is needed to be made smaller than the above-mentioned value.

As described above, when a lens has the refractive index profile and when the deviation of focusing-position is consistent among image heights, a good light spot can be made to every image height by moving a portion of the first optical mechanism in the light axis direction. Accordingly, correction of the shape of the plastic molding tool may be changed. That is, the correction amount is not determined in a way such that the deviated image focusing positions are adjusted relative to the scanning surface over every image height. Instead, the shape of the plastic molding tool is determined so as to make the deviation amount among the image heights smaller. Thereby, the shape of the plastic molding tool can be corrected in a superior manner with a minimum correction amount even though the deviation of the image focusing position from the scanning surface remains.

The optical scanning apparatus described in Japanese Laid-Open Patent Application Publication, No. 10-288749, uses an optical scanning lens having a sufficient margin of focal depth to attempt to generate a good light spot even if the lens has the refractive index profile However, when the diameter of the of the light spot is decreased, it becomes difficult to maintain the sufficient margin of focal depth so that errors in manufacturing and assembling with respect to the lens are severely eliminated. This leads to an increase of coat, while the attempt is not preferable from the viewpoint of image quality.

The optical scanning apparatus described in Japanese Laid-Open Patent Application Publication, No. 11-002768, includes the first optical mechanism which is configured to attempt to correct the deviation of the image focusing position. This apparatus cannot correct the image focusing position over each image height, while the first optical mechanism can correct the deviation of the image focusing position among the image heights by the same amount in the same direction. This apparatus may be effective in a case where the refractive index profile is extremely small and an amount of the deviation of the image focusing position is constant. However, the deviation of the image focusing position caused by the refractive index profile of the actual lens is different among the image heights and such deviation becomes apparent as the lens has a greater amount of deviation of the lens thickness. Therefore, under such conditions, this apparatus cannot generate a good light spot.

The optical scanning apparatus described in Japanese Laid-Open Patent Application Publication, No. 11-038314, is configured to attempt to correct the deviation of the image focusing position caused by the refractive index profile towards the minus side from the scanning surface in the middle area of the image height and towards the plus side from the scanning surface in the peripheral area of the image height. As in the case of Japanese Laid-Open patent Application Publication, No. 11-002768, the apparatus may be effective in a case where the refractive index profile is extremely small and an amount of the deviation of the image focusing position is constant. However, a good light spot cannot be generated with this apparatus.

In addition, none of the apparatuses described by the above mentioned publications describes the pitch of the light spots and a deviation of the pitch.

SUMMARY OF THE INVENTION

In view of the foregoing, it is an object of the present invention to provide a novel optical scanning lens that effectively generates accurately-pitched light spots on a latent image recording surface.

Another object of the present invention is to provide a novel multi-beam scanning optical apparatus that effectively generates accurately-pitched light spots on a latent image recording surface.

Another object of the present invention is to provide a novel image forming apparatus that effectively generator accurately-pitched light spots on a latent image recording surface.

To achieve the above-mentioned object, in one example, a novel optical scanning lens used in a multi-beam scanning optical apparatus that scans a recording surface with multiple scanning beams that form light spots running on the recording surface is provided the optical scanning lens includes an incident surface configured to input the multiple scanning beams and an output surface configured to output the multiple scanning beams to the recording surface. The optical scanning lens has an uneven refractive index profile and satisfies a formula $(m-1) \times PLE \times V/WLs \leq 2.3 \times 10^{-6}$, where m is a number of light emission points of a light source providing light for forming the multiple scanning beams, is a pitch of main light rays of the multiple scanning beams in a sub-scanning direction on the incident surface of the optical scanning lens, V represents the refractive index profile of the optical scanning lens, W [mm] represents an effective recording width of the recording surface, within which the light spots scan the, and WLs represents an effective range of the optical scanning lens in a sub-scanning direction corresponding to the effective recording width W.

The refractive index profile V may satisfy a formula $V \leq 15 \times 10^{-5}$.

Further, to achieve the above-mentioned object, in one example, a novel optical scanning lens optical scanning lens used in a multi-beam scanning optical apparatus that scans a recording surface with multiple scanning beams that form light spots running on the recording surface is provided. The optical scanning lens includes an incident surface configured to input the multiple scanning beams and an output surface configured to output the multiple scanning beams to the recording surface. The lens has an uneven refractive index profile and satisfies a formula $(m-1) \times PLm \times V/WLm \leq 2.3 \times 10^{-6}$, where m is a number of the light emission points of a light source providing light for forming said multiple scanning beams, Plm is a pitch of main light rays of the multiple scanning beams in a main scanning direction on the incident surface of the optical scanning lens, V represents the refractive index profile of the optical scanning lens, W [mm] represents an effective recording width of the recording surface, within which the light spots scan, and WLm represents an effective range of the optical scanning lens in the main scanning direction corresponding to the effective recording width W.

The refractive index profile V may satisfy a formula $V \leq 15 \times 10^{-5}$.

Further, to achieve the above-mentioned object, in one example, a novel multi-beam scanning optical apparatus includes a light source, a first optical mechanism, a light deflecting mechanism, and a second optical mechanism. The light source includes a plurality of light emission points configured to emit light beams. The first optical mechanism is configured to reform the light beams into line images extending in a main scanning direction at an image focusing position. The light deflecting mechanism is configured to deflect the light beams to reform into multiple scanning beams with a plurality of deflective reflection surfaces in a vicinity to the image focusing position mechanism is configured to reform the multiple scanning beams deflected by the light deflecting mechanism into scanning light spots running on a scanning surface. The second optical mechanism includes an optical scanning lens which has an uneven refractive index profile and satisfies a formula $(m-1) \times PLm \times V/WLm \leq 2.3 \times 10^{-6}$. In this formula, m is a number of the light emission points or the light source, PLm is a pitch of main light rays of the multiple beams in the main scanning direction on an incident surface of the optical scanning lens, V represents the refractive index profile of the optical.

scanning lens, W [mm] represents an effective recording width of a recording surface, within which the light spots scan, and WLm represents an effective range of the optical scanning lens in the main scanning direction corresponding to the effective recording width W.

The refractive index profile V may satisfy a formula $V \leq 15 \times 10^{-5}$.

Further, to achieve the above-mentioned object, in one example, a novel multi-beam scanning optical apparatus include a light source, a first optical mechanism, a light deflecting mechanism, and a second optical mechanism. The light source includes a plurality of light emission points at a predetermined pitch in a main scanning direction and configured to emit light beams. The first optical mechanism is configured to reform the light beams into line images extending in a main scanning direction at an image focusing position. The light deflecting mechanism is configured to deflect the light beams to reform into multiple scanning beams with a plurality of deflective reflection surfaces in a vicinity to the image focusing position. The second optical thereon. The optical scanning mechanism is configured to reform the multiple scanning beams deflected by the light deflecting mechanism into scanning light spots running on a scanning surface. The second optical mechanism includes an optical scanning lens that has an uneven refractive index-profile and satisfies a formula $(m-1) \times PLm \times V/WLm \leq 2.3 \times 10^{-6}$. In this formula, m is a number of the light emission points of the light source, PLm is a pitch of main light rays of the multiple beams in the main scanning direction on an incident surface of the optical scanning lens, 17 represents the scanning lens, W [mm] represents an effective recording width of a recording surface, within which the light spots scan, and WLm represents an effective range of the optical scanning lens in the main scanning direction corresponding to the effective recording width W.

The refractive index profile V may satisfy a formula $V \leq 15 \times 10^{-5}$.

Further, to achieve the above-mentioned object, in one example, a novel image forming apparatus includes an image carrying member and an optical scanning mechanism. The image carrying member includes a photosensitive surface serving as a latent image recording surface mechanism is configured to perform an optical scanning relative to the photosensitive surface to form a latent image thereon. The optical scanning mechanism includes a light source, a first optical mechanism, a light deflecting mechanism, and a second optical mechanism. The light source includes a plurality of light emission points configured to emit light beams. The first optical mechanism is configured to reform the light beams into line images extending in a main scanning direction at an image focusing position. The light deflecting mechanism is configured to deflect the light beams to reform into multiple scanning beams with a plurality of deflective reflection surfaces in a vicinity to the image focusing position. The second optical mechanism is configured to reform the multiple scanning beams deflected by the light deflecting mechanism into scanning light spots running on the recording surface. The second optical mechanism includes an optical scanning lens that has an uneven refractive index profile and satisfies a formula $(m-1) \times PLm \times V/WLm \leq 2.3 \times 10^{-6}$. In this formula, m is a number of the light emission points of the light source, Plm is a pitch of main light rays of the multiple beams in the main scanning direction on an incident surface of the optical scanning lens, V represents the refractive index profile of the optical scanning lens, W [mm] represents an effective recording width of the recording surface, within which the light spots scan the recording surface, and Wlm represents an effective range of the optical scanning lens in the main scanning direction corresponding to the effective recording width W.

The refractive index profile V may satisfy a formula $V \leq 15 \times 10^{-5}$.

To achieve the above-mentioned object, in one example, a novel image forming apparatus includes an image carrying member and an optical scanning mechanism. The image carrying member includes a photosensitive surface serving as a latent image recording surface. The optical scanning mechanism is configured to perform an optical scanning relative to the photosensitive surface to form a latent image thereon. The optical scanning mechanism includes a light source, a first optical mechanism, a light deflecting mechanism, and a second optical mechanism. The light source includes a plurality of light emission points at a predetermined pitch in a main scanning direction, and configured to emit light beams. The first optical mechanism is configured to reform the light beams into line images extending in a main scanning direction at an image focusing position. The light deflecting mechanism is configured to deflect the light beams to reform into multiple scanning beams a plurality surfaces in a vicinity to the image focusing position. The second optical mechanism configured to reform the multiple scanning beams deflected by the light deflecting mechanism into scanning light spots running on the recording surface. The second optical mechanism includes an optical scanning lens that has an uneven refractive index profile and satisfies a formula $(m-1) \times PLm \times V / WLm \leq 2.3 \times 10^{-6}$. In this formula, m is a number of the light emission points of the light source, Plm is a pitch of main light rays of the multiple beams in the main scanning direction on an incident surface of the optical scanning lens, V represents the refractive index profile of the optical scanning lens, W [mm] represents an effective recording width of the recording surface, within which the light spots scan the recording surface, and Wlm represents an effective range of the optical scanning lens in the main scanning direction corresponding to the-effective recording width W.

The refractive index profile V may satisfy a formula $V \leq 15 \times 10^{-5}$.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1A:
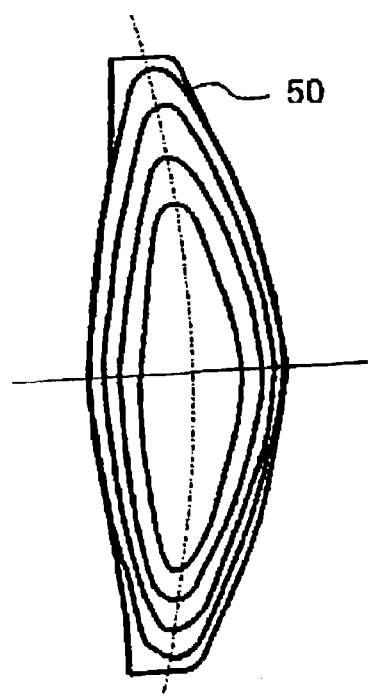
FIG. 1A is a cross-sectional view of a background optical scanning lens seen in a light axis direction and in a main scanning direction.
Figure 1B:
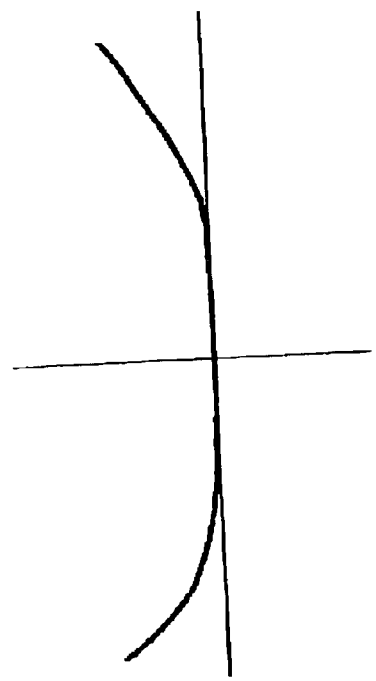
FIG. 1B is a graph representing a refractive index profile of the background optical scanning lens seen along a thickness center line of the background optical scanning lens indicated by a dotted line shown in FIG. 1A.
Figure 1C:
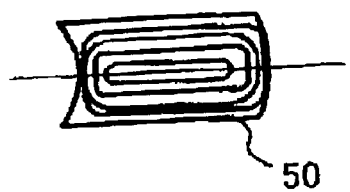
FIG. 1C is a cross-sectional view of the background optical scanning lens seen in the light axis and in a sub-scanning direction.
Figure 1D:
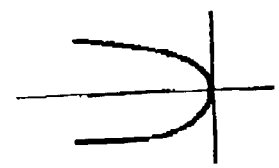
FIG. 1D is a graph representing the refractive index profile of tho background optical canning lone even along a thickness center line of the background optical scanning lens.
Figure 1E:
FIG. 1E is a graph representing the refractive index profile of the background optical scanning lens seen along a plane in parallel to the main scanning direction.
Figure 2:
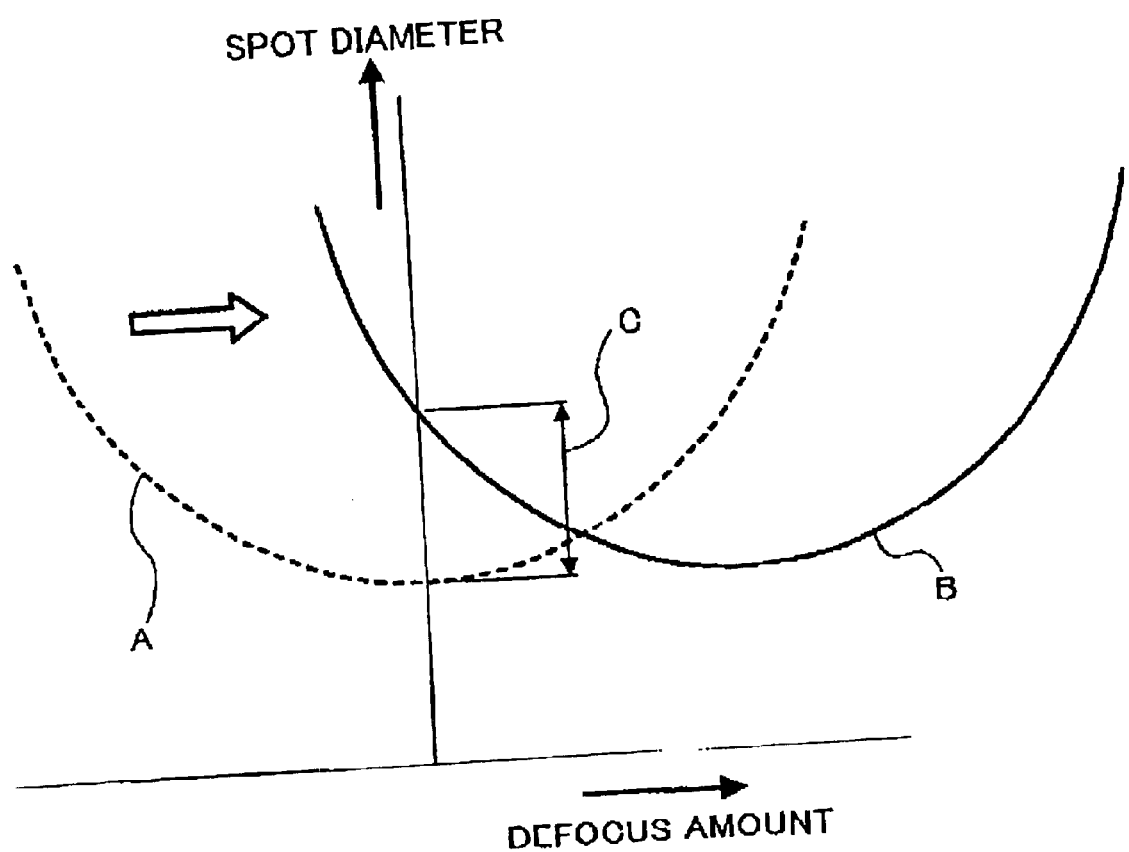
FIG. 2 is a graph demonstrating a variation in an amount of defocus on a scanning surface due to a refractive index profile of the background optical scanning lens.
Figure 3:
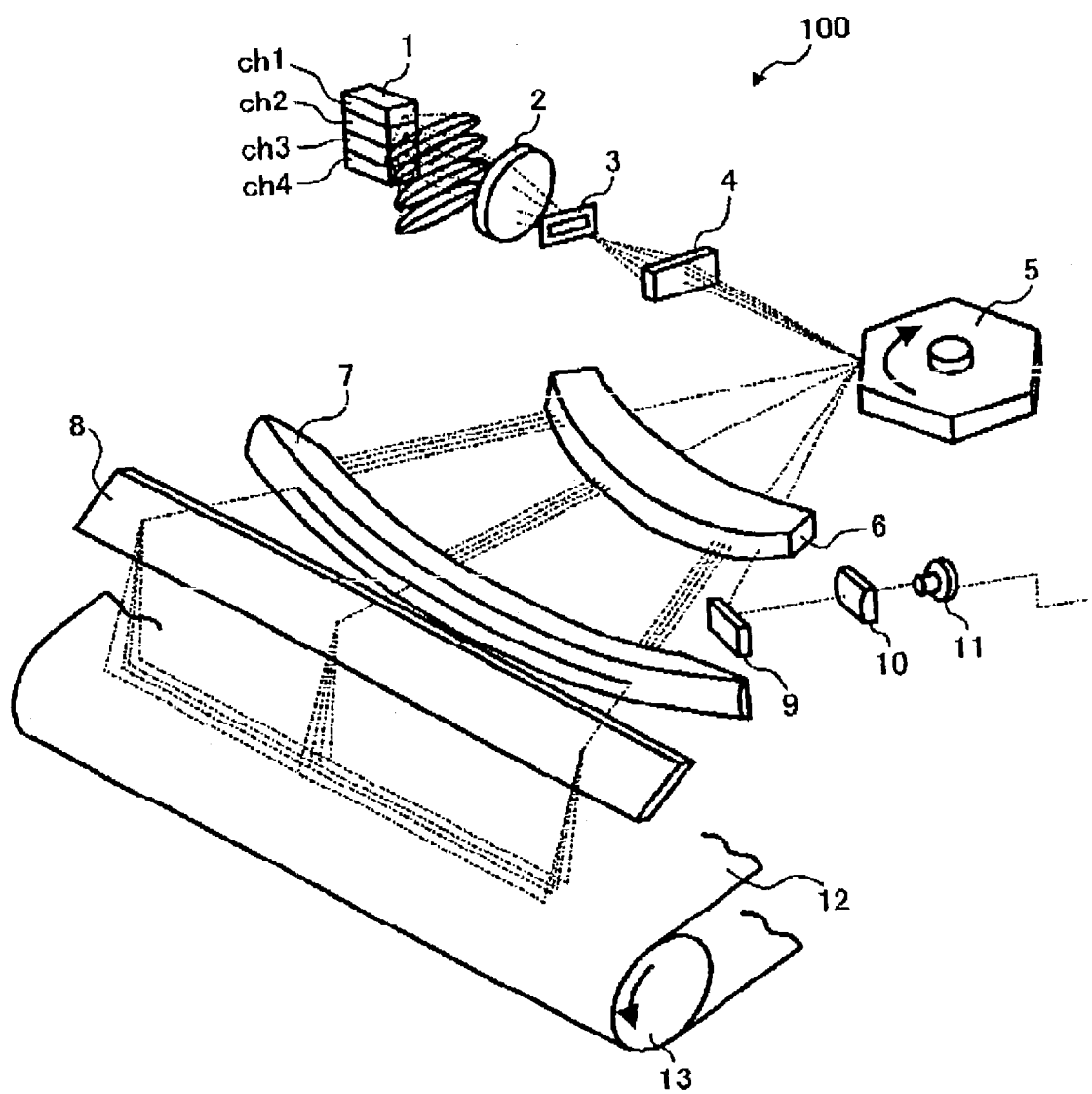
FIG. 3 is a schematic diagram of a multi-beam scanning optical system according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a multi-beam scanning optical apparatus 100 according to a preferred embodiment of the present invention is explained. FIG. 3 shows the multi-beam scanning optical system 100 that includes a light source 1, a coupling lens 2, an aperture element 3, a cylindrical lens 4, a polygon mirror 5, lenses 6 and 7, mirrors 8 and 9, a lens 10, and a photoreceptor 11. In FIG. 3, reference numeral 12 denotes a photosensitive member and reference numeral 13 denotes a roller. The photosensitive member 12 includes a photosensitive belt and is driven by the roller 13.

The light source 1 includes four light emission points, for example, which are referred to as light channels CH1–CH4, each for emitting a light beam. The four light beams emitted from the light channels CH1–CH4 of the light source 1 are coupled to the following optical system by the coupling lens 2. Each of the light beams coupled by the coupling lens 2 may have a form of a weak divergent light beam, a weak convergent light beam, or a parallel light beam in accordance with optical characteristics of the following optical system.

Each of the four light beams passing through the coupling lens 2 runs through an opening of the aperture element 3, and the light portions around the perimeter of the light beam are cut off by the aperture element 3 so that each light beam is formed to have a predetermined cross section. After running through the aperture element 3, each of the light beams enters the cylindrical lens 4. The cylindrical lens 4 is a molded-plastic lens and has a non-power direction in a main scanning direction and a positive power direction in a sub-scanning direction. Thus, the cylindrical lens 4 is capable of causing the light beams entered therein to converge in the sub-scanning direction and to be focused to four line images extending in the main scanning direction at a position around an area in the close vicinity of a deflective reflection surface of the polygon mirror 5 which rotates. The four light beams focused to the four line images are reflected within a plane in the main scanning direction by each of the deflective reflection surface of the rotating polygon mirror 5. In the multi-beam scanning optical system 100, an optical sub-system from the coupling lens 2 to the cylindrical lens 4 is referred to as a first optical sub-system.

The above-described four light beams reflected by the polygon mirror 5 are continuously deflected in a manner similar to a constant acceleration motion according to a constant speed rotation of the polygon mirror 5. While being thus deflected, the four light beams run to the surface of the photosensitive member 12 via the lenses 6 and 7 and the mirror 8 and form four light spots separated in the sub-scanning direction on the surface of the photosensitive member 12. The beams scan the surface of the photosensitive member 12 with the four light spots at the same time. This scanning with the four light spots at the same time is referred to as a multi-beam scanning. In the multi-beam scanning optical system 100, an optical sub-system from the lens 6 to the lens 7 is referred to as a second optical sub-system. The lenses 6 and 7 are molded-plastic lenses.

When the four light beams are deflected by the polygon mirror 5, the beams enter a light detection mechanism for detecting a scan start time before starting the above-described multi-beam scanning. The light detection mechanism includes the mirror 9, the lens 10, and the photoreceptor 11. In the light detection mechanism, the light beams are reflected by the mirror 9 and the reflected light beams are caused to converge by the lens 10 to focus on the surface of the photoreceptor 11. Thus, the light beams are detected by the photoreceptor 11 before starting the multi-beam scanning.

Each of the lenses, serving as optical components included in the second optical sub-system, has a lens surface formed in a shape calculated by the following formulas. A first formula described below represents a shape of a non-circular arc of the lens surface in a main-scanning cross-sectional plane with respect to the lens (e.g., the lenses 6 and 7) included in the second optical sub-system. The first formula is;

i $X = (Y^2/R_m)/[1+\sqrt{1-(1+K_m)(Y/R_m)^2}] + A_1Y + A_2Y^2 + A_3Y^3 + A_4Y^4 + A_5Y^5 + A_6Y^6 \ldots,$ wherein X is one of three-dimensional coordinates and represents a depth in a light axis direction, Y is one of three-dimensional coordinates and represents a distance from a light axis in the main scanning direction, $K_m$ is a cone constant, $R_m$ is a paraxial curvature radius in the main-scanning cross-sectional plane of the lenses, and $A_1$, $A_2$, $A_3$, $A_4$, $A_5$, $A_6$, and so on are higher order coefficients with respect to Y. When values other than 0 are assigned to odd-numbered high order coefficients of Y including $A_1$, $A_3$, $A_5$, and so on in the first formula, the shape of the lens (e.g., the lenses 6 and 7) in the main scanning cross-sectional plane becomes asymmetrical relative to the light axis in the main scanning direction.

A second formula below represents a curvature $C_s(Y)$ of the lens surface in a sub-scanning cross-sectional plane when the curvature $C_s(Y)$ varies in the main scanning direction with a variant of a coordinate Y having an original point at a position of the light axis. The second formula is;

$C_s(Y) = 1/R_s(0) + B_1Y + B_2Y^2 + B_3Y^3 + B_4Y^4 + B_5Y^5 + B_6Y^6 + \ldots,$ wherein $R_s(0)$ is a curvature radius on the light axis in the sub-scanning cross-sectional plane of the lens, and $B_1$, $B_2$, $B_3$, $B_4$, $B_5$, $B_6$, and so on are higher order coefficients with respect to Y. When values other than 0 are assigned to odd-numbered high order coefficients of Y including $B_1$, $B_3$, $B_5$, and so on in the second formula, the curvature of the lens (e.g., the lenses 6 and 7) in the sub-scanning cross-sectional plane varies in an asymmetrical manner relative to the light axis in the main scanning direction.

A third formula below represents a shape of a non-circular surface of the lens in a sub-scanning cross-sectional plane thereof. The third formula is;

$X = (Y^2/R_m)/[1+\sqrt{1-(1+K_m)(Y/R_m)^2}]$ $+A_1Y+A_2Y^2+A_3Y^3+A_4Y^4$ $+A_5Y^5+A_6Y^6+\ldots$ $+(C_sZ^2)/[1+\sqrt{1-(1+K_m)(C_sZ)^2}]$ $+(F_0+F_1Y+F_2Y^2+F_3Y^3+F_4Y^4+\ldots)Z$ $+(G_0+G_1Y+G_2Y^2+G_3Y^3+G_4Y^4+\ldots)Z^2$ $+(H_0+H_1Y+H_2Y^2+H_3Y^3+H_4Y^4+\ldots)Z^3$ $+(I_0+I_1Y+I_2Y^2+I_3Y^3+I_4Y^4+\ldots)Z^4$ $+(J_0+J_1Y+J_2Y^2+J_3Y^3+J_4Y^4+\ldots)Z^5$ $+(K_0+K_1Y+K_2Y^2+K_3Y^3+K^4Y^4+\ldots)Z^6$ $+(L_0+L_1Y+L_2Y^2+L_3Y^3+L_4Y^4+\ldots)Z^7$ $+(M_0+M_1Y+M_2Y^2+M_3Y^3+M_4Y^4+\ldots)Z^8$ $+(N_0+N_1Y+N_2Y^2+N_3Y^3+N_4Y^4+\ldots)Z^9,$ wherein X is the coordinate representing a depth in the light axis direction, Y is the coordinate representing a position of the sub-scanning cross-sectional plane relative to the light axis in the main scanning direction, Z is a coordinate in the sub-scanning direction, $R_m$ is as used in the first formula, $C_s$ is equal to $C_s(Y)$ defined above in the second formula, and $K_s$ is defined by a fourth formula provided below. Further, $F_0$, $F_1$, $F_2$, $F_3$, $F_4$, and so on, $G_0$, $G_1$, $G_2$, $G_3$, $G_4$, and so on, and $H_0$, $H_1$, $H_2$, $H_3$, $H_4$, and so on are coefficients in respective polynomials of Y used as respective high-order coefficients of Z. Also, I, J, K, L, M, and N are similarly used as variations of coefficients in respective polynomials of Y used as respective high-order coefficients of Z in the third formula. The fourth formula is;

$K_s = K_s(0) + C_1Y + C_2Y^2 + C_3Y^3 + C_4Y^4 + C_5Y^5 + \ldots.$

When values other than 0 are assigned to odd-numbered high order coefficients in the respective polynomials of Y including $F_1$, $F_3$, $F_5$, and so on and those of G, H, I, J, K, L, M, and N used as coefficients in the respective polynomials of Y in the third formula, the shape of the non-circular-surface of the lens (e.g., the lenses 6 and 7) in the sub-scanning cross-sectional plane becomes asymmetrical relative to the light axis in the main scanning direction.

That is, the non-circular-arc surface of the lens in the sub-scanning cross-sectional plane expressed by the third formula is a surface having the non-circular-arc shape in the sub-scanning cross-sectional plane and changing in accordance with the position of the sub-scanning cross-sectional plane in the main scanning direction. In the right side of the third formula, functions included in its first and second lines are those of Y representing the coordinate in the main scanning direction, that is, expressing a shape of the main-scanning cross-sectional plane. Each coefficient of Z in a third line and subsequent lines in the right side of the third formula is uniquely determined when the coordinate Y of the sub-scanning cross-sectional plane is provided. Thus, the shape of the non-circular-arc in the sub-scanning cross-sectional plane at the coordinate Y is determined by the third formula.

The above-described formulas are not only expressions expressing the shape of the lens surface and there may be various formulas applicable. Accordingly, the shape of the lens according to the present invention is not limited to the formulas described above but it can be expressed by various other formulas.

When the lens (e.g., the lenses 6 and 7) included in the second optical sub-system internally has a refractive index profile, such refractive index profile is expressed by a fifth formula;

$$n = n_0 + a_0 + a_1 Y + a_2 Y^2$$
$$+ a_3 Y^3 + a_4 Y^4 + \ldots$$
$$+ (b_0 + b_1 Y + b_2 Y^2 + b_3 Y^3$$
$$+ b_4 Y^4 + \ldots) Z +$$
$$(c_0 + c_1 Y + c_2 Y^2 + c_3 Y^3$$
$$+ c_4 Y^4 + \ldots) Z^2$$
$$+ (d_0 + d_1 Y + d_2 Y^2$$
$$+ d_3 Y^3 + d_4 Y^4$$
$$+ \ldots) Z^3 + (e_0 + e_1 Y + e_2 Y^2 + e_3 Y^3 + e_4 Y^4 + \ldots) Z^4,$$

wherein, n is a refractive index profile, $n_0$ is a reference refractive index profile, and $a_0$, $a_1$, $a_2$, $a_3$, $a_4$, and so on are coefficients of Y. Further, in the fifth formula, $b_0$, $b_1$, $b_2$, $b_3$, $b_4$, and so on, $c_0$, $c_1$, $c_2$, $c_3$, $c_4$, and so on, $d_0$, $d_1$, $d_2$, $d_3$, $d_4$, and so on, and $e_0$, $e_1$, $e_2$, $e_3$, $e_4$, ans so on are coefficients in respective polynomials of Y used as respective high-order coefficients of Z.

Figure 4:
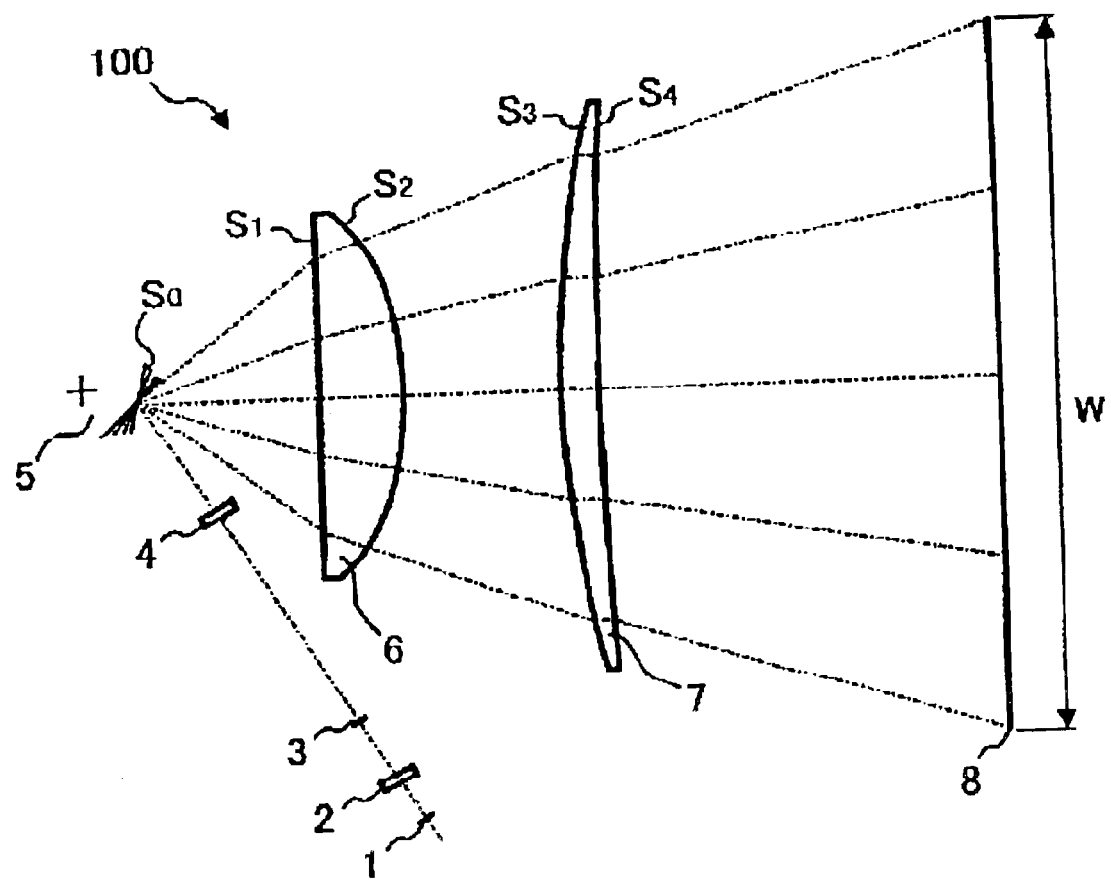
FIG. 4 is another view of the optical scanning system of FIG. 3.

FIG. 4 demonstrates a flow, seen from the top, of the light beams in the multi-beam scanning optical system 100 of FIG. 3. The optical components used in the multi-beam scanning optical system 100 are more specifically explained with reference to FIG. 4. The light source 1 having the four light emission points is a laser diode array in which a pitch between adjacent two light emission points is 14 μm, for example, and light emitted by each light emission point has a wave length of approximately 780 nm, for example. The coupling lens 2 consists of one element in one group, for example, having a focal length of approximately 27 mm, for example, and causes a collimate effect relative to incident light lays. The cylindrical lens 4 has a focal length of approximately 58.7 mm, for example, in the sub-scanning direction. The polygon mirror 5 has five deflective reflection surfaces, for example, and a pentangular cross section having an inradius of approximately 20 mm, for example. In addition, the light beam emitted from the light source 1 and the light axis of the second optical system forms an angle of approximately 60°, for example.

Table 1 below represents in more details the data of deflective reflection surfaces S0–S5 provided to the polygon mirror 5 and the lenses 6 and 7.

TABLE 1

| A1 | A2 | $R_m$ | $R_S(0)$ | X | Y | n |
|---|---|---|---|---|---|---|
| p.m. 5 | S0 | ∞ | ∞ | 72.56 | 0.406 | |
| lens 6 | S1 | 1616.43 | −50.14 | 35 | 0 | 1.52398 |
| lens 6 | S2 | −146.51 | −199.81 | 61.93 | 0 | |
| lens 7 | S3 | 400.87 | −72.03 | 14 | 0 | 1.52398 |
| lens 7 | S4 | 824.88 | −27.59 | 160.56 | 0 | |

In Table 1, A1 represents names of the components, wherein the p.m. 5 is the polygon mirror 5, A2 represents the surface numbers provided to the components as indicated in FIG. 4.

Coefficients pertinent to the surfaces S1–S4 in the main scanning and sub-scanning directions are provided below in Tables 2–5, respectively.

TABLE 2 coefficients for S1

| main scanning direction | sub-scanning direction |
|---|---|
| $R_m = 1616.426$ | $R_S = -50.145$ |
| $K = 1.976 \times 10^2$ | $B_1 = -1.162 \times 10^{-5}$ |
| $A_1 = 0$ | $B_2 = 2.276 \times 10^{-6}$ |
| $A_2 = 0$ | $B_3 = 2.714 \times 10^{-9}$ |
| $A_3 = 0$ | $B_4 = -1.544 \times 10^{-10}$ |
| $A_4 = 1.281 \times 10^{-8}$ | $B_5 = -4.265 \times 10^{-13}$ |
| $A_5 = 0$ | $B_6 = 6.417 \times 10^{-15}$ |
| $A_6 = -6.374 \times 10^{-13}$ | $B_7 = 9.179 \times 10^{-19}$ |
| $A_7 = 0$ | $B_8 = -1.230 \times 10^{-19}$ |
| $A_8 = -9.428 \times 10^{-17}$ | $B_9 = 1.453 \times 10^{-20}$ |
| $A_9 = 0$ | $B_{10} = -1.881 \times 10^{-22}$ |
| $A_{10} = 5.965 \times 10^{-21}$ | $B_{11} = -1.468 \times 10^{-24}$ |
| $A_{11} = 0$ | $B_{12} = -2.670 \times 10^{-26}$ |

TABLE 3 coefficients for S2

| main scanning direction | sub-scanning direction |
|---|---|
| $R_m = -146.513$ | $R_S = -199.813$ |
| $K = -1.857 \times 10^{-1}$ | $B_1 = 0$ |
| $A_1 = 0$ | $B_2 = -2.125 \times 10^{-6}$ |
| $A_2 = 0$ | $B_3 = 0$ |
| $A_3 = 0$ | $B_4 = 1.805 \times 10^{-11}$ |
| $A_4 = 1.774 \times 10^{-8}$ | $B_5 = 0$ |
| $A_5 = 0$ | $B_6 = 2.716 \times 10^{-14}$ |
| $A_6 = 1.384 \times 10^{-13}$ | $B_7 = 0$ |
| $A_7 = 0$ | $B_8 = 6.924 \times 10^{-19}$ |
| $A_8 = -4.354 \times 10^{-17}$ | $B_9 = 0$ |
| $A_9 = 0$ | $B_{10} = -2.685 \times 10^{-22}$ |
| $A_{10} = 7.168 \times 10^{-21}$ | $B_{11} = 0$ |
| $A_{11} = 0$ | $B_{12} = -5.778 \times 10^{-26}$ |

TABLE 4 coefficients for S3

| main scanning direction | sub-scanning direction |
|---|---|
| $R_m = 400.875$ | $R_S = -72.026$ |
| $K = -12.603$ | $B_1 = 0$ |
| $A_1 = 0$ | $B_2 = -1.962 \times 10^{-7}$ |
| $A_2 = 0$ | $B_3 = 0$ |
| $A_3 = 0$ | $B_4 = 2.230 \times 10^{-11}$ |
| $A_4 = -7.349 \times 10^{-9}$ | $B_5 = 0$ |
| $A_5 = 0$ | $B_6 = -1.022 \times 10^{-15}$ |
| $A_6 = -2.106 \times 10^{-13}$ | $B_7 = 0$ |
| $A_7 = 0$ | $B_8 = 1.081 \times 10^{-20}$ |

TABLE 4-continued coefficients for S3

| main scanning direction | sub-scanning direction |
|---|---|
| $A_8 = 8.173 \times 10^{-18}$ | $B_9 = 0$ |
| $A_9 = 0$ | $B_{10} = 6.363 \times 10^{-25}$ |
| $A_{10} = 5.409 \times 10^{-22}$ | $B_{11} = 0$ |
| $A_{11} = 0$ | $B_{12} = -3.645 \times 10^{-29}$ |
| $A_{12} = -1.082 \times 10^{-26}$ | $B_{13} = 0$ |
| $A_{13} = 0$ | $B_{14} = 0$ |
| $A_{14} = -2.039 \times 10^{-32}$ | $B_{15} = 0$ |

TABLE 5 coefficients for S4

| main scanning direction | sub-scanning direction |
|---|---|
| $R_m = 824.882$ | $R_S = -27.588$ |
| $K = -71.068$ | $B_1 = -8.546 \times 10^{-7}$ |
| $A_1 = 0$ | $B_2 = 4.161 \times 10^{-7}$ |
| $A_2 = 0$ | $B_3 = -2.523 \times 10^{-11}$ |
| $A_3 = 0$ | $B_4 = -2.960 \times 10^{-11}$ |
| $A_4 = -1.324 \times 10^{-8}$ | $B_5 = 2.114 \times 10^{-16}$ |
| $A_5 = 0$ | $B_6 = 1.160 \times 10^{-15}$ |
| $A_6 = 9.662 \times 10^{-14}$ | $B_7 = 4.372 \times 10^{-22}$ |
| $A_7 = 0$ | $B_8 = -1.098 \times 10^{-21}$ |
| $A_8 = 1.888 \times 10^{-17}$ | $B_9 = 5.560 \times 10^{-24}$ |
| $A_9 = 0$ | $B_{10} = -7.785 \times 10^{-25}$ |
| $A_{10} = -3.102 \times 10^{-22}$ | $B_{11} = -1.617 \times 10^{-29}$ |
| $A_{11} = 0$ | $B_{12} = 3.262 \times 10^{-30}$ |
| $A_{12} = 7.298 \times 10^{-27}$ | $B_{13} = 0$ |
| $A_{13} = 0$ | $B_{14} = 0$ |
| $A_{14} = 2.305 \times 10^{-32}$ | $B_{15} = 0$ |

Figure 5A:
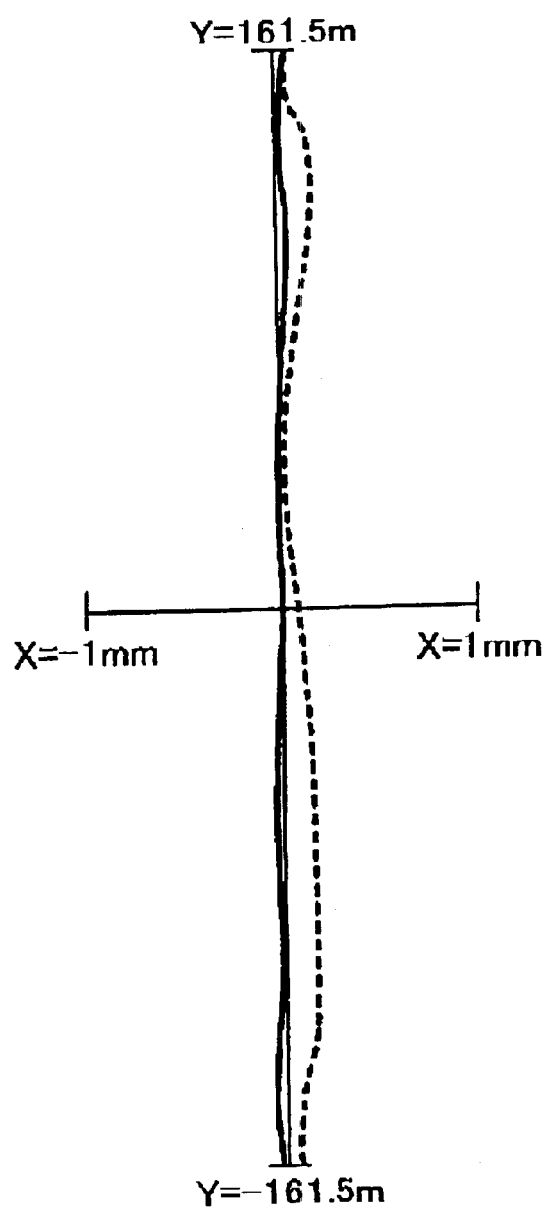
FIGS. 5A and 5B are graphs of optical characteristics pertinent to optical scanning lenses used in the optical scanning system of FIG. 3.

FIG. 5A shows image focusing positions by the lens having properties based on the values of the coefficients indicated in Tables 2–5 in the main scanning and sub-scanning directions, in which a dotted line indicates the image focusing positions in the main scanning direction and a solid line indicates the image focusing positions in the sub-scanning direction.

Measurements were made with respect to refractive index profiles of the lenses 6 and 7. As the measurement results, the lens 6 has a refractive index profile V of $1.84 \times 10^{-5}$ in a width of approximately 4 mm in the sub-scanning direction and the lens 7 has a refractive index profile V of $2.1 \times 10^{-5}$ in a width of approximately 8 mm in the sub-scanning direction. Therefore, when the refractive index profile n is determined as $0.5 \times 10^{-6} \leq n \leq 5.0 \times 10^{-4}$, values of the coefficients set forth in the right side of the fifth formula are provided in Tables 6 and 7.

TABLE 6 refractive index profile coefficients for S1

| $n_0 = 1.52398$ | $a_0 = 0$ |
|---|---|
| $b_0 = 2.498 \times 10^{-6}$ | $d_0 = -1.510 \times 10^{-7}$ |
| $b_1 = -3.165 \times 10^{-8}$ | $d_1 = -4.064 \times 10^{-9}$ |
| $b_2 = -1.855 \times 10^{-10}$ | $d_2 = 8.358 \times 10^{-11}$ |
| $b_3 = 3.002 \times 10^{-12}$ | $d_3 = 5.886 \times 10^{-13}$ |
| $b_4 = 8.680 \times 10^{-14}$ | $d_4 = -9.710 \times 10^{-15}$ |
| $c_0 = 1.647 \times 10^{-6}$ | $e_0 = 1.359 \times 10^{-7}$ |
| $c_1 = -2.344 \times 10^{-8}$ | $e_1 = 2.212 \times 10^{-9}$ |
| $c_2 = -6.445 \times 10^{-11}$ | $e_2 = -1.022 \times 10^{-11}$ |
| $c_3 = 2.666 \times 10^{-12}$ | $e_3 = -5.394 \times 10^{-13}$ |
| $c_4 = -1.854 \times 10^{-15}$ | $e_4 = -3.080 \times 10^{-15}$ |

TABLE 7 refractive index profile coefficients for S3

| $n_0 = 1.52398$ | $a_0 = 0$ |
|---|---|
| $b_0 = -7.619 \times 10^{-7}$ | $d_0 = -4.091 \times 10^{-9}$ |
| $b_1 = -5.664 \times 10^{-9}$ | $d_1 = -4.058 \times 10^{-10}$ |
| $b_2 = 2.726 \times 10^{-10}$ | $d_2 = -1.569 \times 10^{-11}$ |
| $b_3 = 3.143 \times 10^{-13}$ | $d_3 = -2.782 \times 10^{-14}$ |
| $b_4 = -7.369 \times 10^{-15}$ | $d_4 = 1.191 \times 10^{-15}$ |
| $c_0 = -2.408 \times 10^{-7}$ | $e_0 = 2.020 \times 10^{-8}$ |
| $c_1 = 2.126 \times 10^{-9}$ | $e_1 = 2.376 \times 10^{-11}$ |
| $c_2 = 1.906 \times 10^{-10}$ | $e_2 = -2.579 = 10^{-12}$ |
| $c_3 = -3.224 \times 10^{-14}$ | $e_3 = 1.005 \times 10^{-14}$ |
| $c_4 = -1.669 \times 10^{-14}$ | $e_4 = 2.884 \times 10^{-16}$ |

Figure 5B:
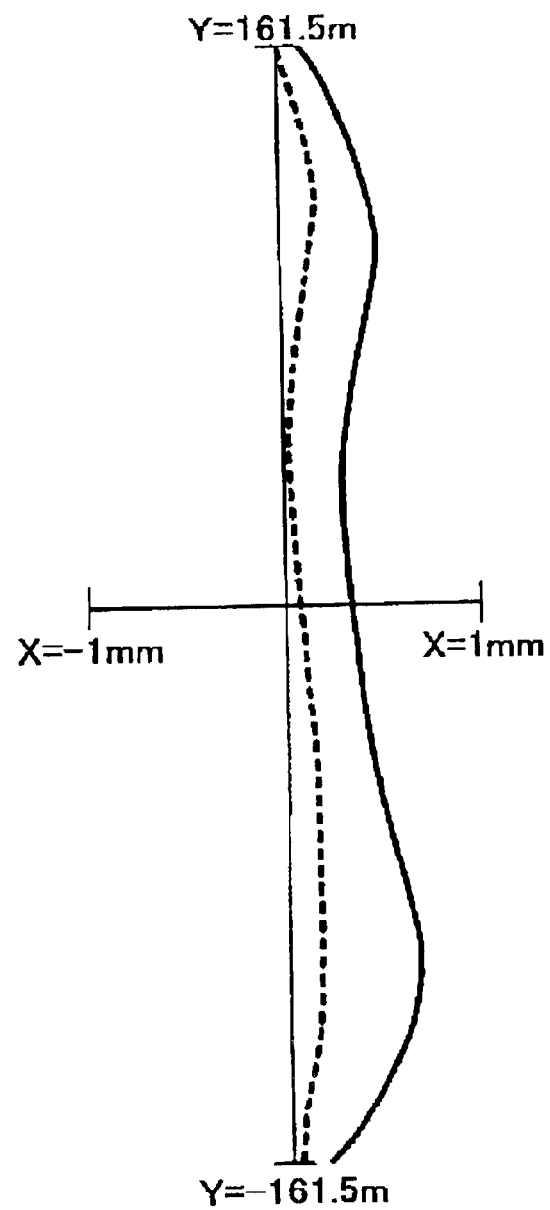

FIG. 5B shows image focusing positions by the lens with properties based on the values of the coefficients indicated in Tables 6 and 7 in the main scanning and sub-scanning directions, in which a dotted line indicates the image focusing positions in the main scanning direction and a solid line indicates the image focusing positions in the sub-scanning direction.

In order to correct deviations of the image focusing positions appearing in FIG. 5B, the coefficients of each surface of the lens 6 in the sub-scanning direction are determined. The thus-determined coefficients are shown in Tables 8 and 9.

TABLE 8 corrected coefficients for S1

| main scanning direction | sub-scanning direction |
|---|---|
| $R_m = 1616.426$ | $R_S = -50.053$ |
| $K = 1.976 \times 10^2$ | $B_1 = -1.528 \times 10^{-5}$ |
| $A_1 = 0$ | $B_2 = 2.269 \times 10^{-6}$ |
| $A_2 = 0$ | $B_3 = 4.738 \times 10^{-9}$ |
| $A_3 = 0$ | $B_4 = -1.624 \times 10^{-10}$ |
| $A_4 = 1.281 \times 10^{-8}$ | $B_5 = -8.632 \times 10^{-13}$ |
| $A_5 = 0$ | $B_6 = 7.137 \times 10^{-15}$ |
| $A_6 = -6.374 \times 10^{-13}$ | $B_7 = 1.537 \times 10^{-17}$ |
| $A_7 = 0$ | $B_8 = 1.603 \times 10^{-19}$ |
| $A_8 = -9.428 \times 10^{-17}$ | $B_9 = 2.191 \times 10^{-20}$ |
| $A_9 = 0$ | $B_{10} = -2.218 \times 10^{-22}$ |
| $A_{10} = 5.965 \times 10^{-21}$ | $B_{11} = -2.095 \times 10^{-24}$ |
| $A_{11} = 0$ | $B_{12} = -5.115 \times 10^{-26}$ |

TABLE 9 corrected coefficients for S2

| main scanning direction | sub-scanning direction |
|---|---|
| $R_m = -146.513$ | $R_S = -203.654$ |
| $K = -1.857 \times 10^{-1}$ | $B_1 = 0$ |
| $A_1 = 0$ | $B_2 = -2.185 \times 10^{-6}$ |
| $A_2 = 0$ | $B_3 = 0$ |
| $A_3 = 0$ | $B_4 = 1.472 \times 10^{-11}$ |
| $A_4 = 1.774 \times 10^{-8}$ | $B_5 = 0$ |
| $A_5 = 0$ | $B_6 = 3.276 \times 10^{-14}$ |
| $A_6 = 1.384 \times 10^{-13}$ | $B_7 = 0$ |
| $A_7 = 0$ | $B_8 = 7.255 \times 10^{-19}$ |
| $A_8 = -4.354 \times 10^{-17}$ | $B_9 = 0$ |
| $A_9 = 0$ | $B_{10} = -3.528 \times 10^{-22}$ |
| $A_{10} = 7.168 \times 10^{-21}$ | $B_{11} = 0$ |
| $A_{11} = 0$ | $B_{12} = -6.967 \times 10^{-26}$ |

Table 10 below indicates further detailed data relating to the multi-beam scanning optical system 100 in which the four light emission points of the laser diode array, i.e., the light source 1, are arranged in the same direction as the sub-scanning direction and the pitch of the multiple beams in the sub-scanning direction on the photosensitive surface to be scanned is set to 0.0212 mm which is equivalent to 1200 dpi. In Table 10, m represents a number of the light beams, which is four, entering each of the lenses, PLs represents a pitch of the main light rays of the multiple beams in the sub-scanning direction on the incident surface of each lens, V represents the refractive index profile of each lens, W [mm] represents an effective recording width of the photosensitive surface within which the light spots scan the photosensitive surface, and WLs represents an effective range of the lens in the sub-scanning direction corresponding to the effective recording width W.

TABLE 10

|  | S1 | S2 |
| --- | --- | --- |
| WLs | 4 mm | 8 mm |
| V | $1.84 \times 10^{-5}$ | $2.1 \times 10^{-5}$ |
| (m − 1) × PLs | 0.03 mm | 0.02 mm |
| (m − 1) × PLs × V/WLs | $0.138 \times 10^{-6}$ | $0.053 \times 10^{-6}$ |

Figure 6:
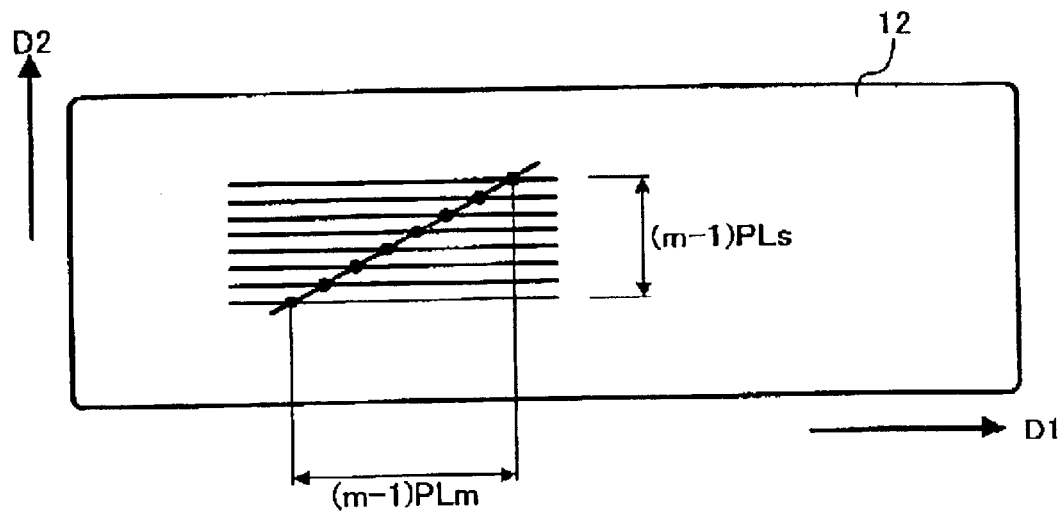
FIG. 6 is an illustration for explaining an extension of light in the main scanning and sub-scanning directions.

As shown in FIG. 6, the value of (m−1)×PLs in Table 10 is a distance in the sub-scanning direction between centers of outermost two light spots. In the multi-beam scanning optical system 100, a deviation amount in the pitch between adjacent two light spots is restrained at a level of 4.8%, which is smaller than 10%. In FIG. 6, D1 represents the main scanning direction and D2 represents the sub-scanning direction.

Figure 7:
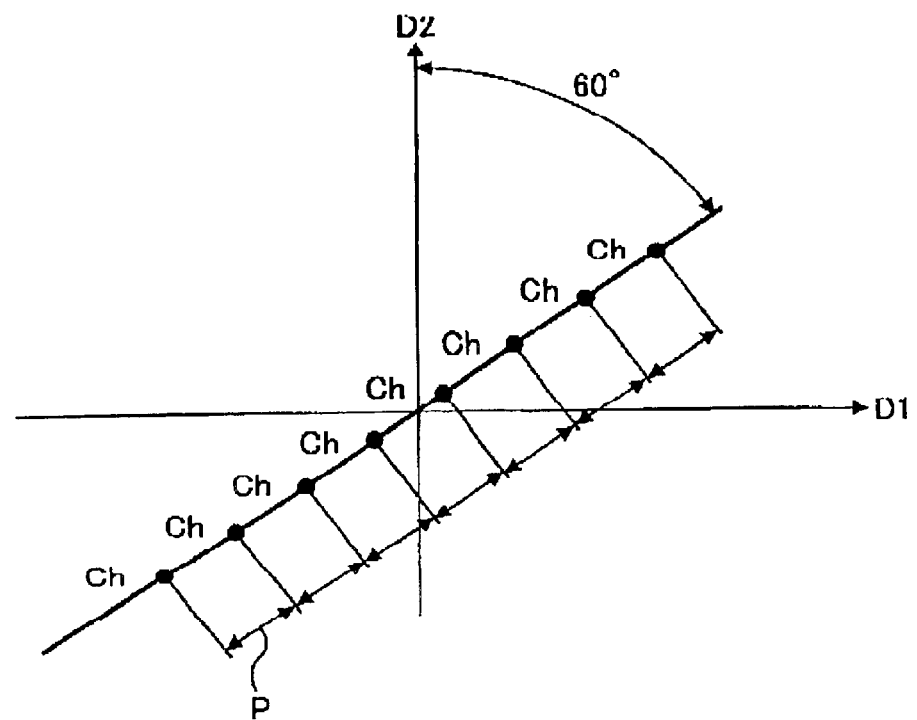
FIG. 7 is an illustration for explaining a light source for multiple beams.

FIG. 7 shows a light source 101 which can be used as a substitution for the light source 1. The light source 101 includes eight light emission points arranged in line at a predetermined pitch and a line on which the eight light emission points are aligned does not match either the main scanning direction or the sub-scanning direction, as shown in FIG. 7.

More specifically, the pitch of the light emission points is approximately 14 μm, for example, and the light emitted from each of the eight light emission points has a wave length of approximately 780 nm, for example. The laser diode array is arranged with an angle of 60° relative to the sub-scanning direction.

Table 11 below indicates detailed data relating to the multi-beam scanning optical system 100, in which the light source 1 is replaced with the light source 101 and the pitch of the multiple beams in the sub-scanning direction on the photosensitive surface to be scanned is set to 0.0212 mm which is equivalent to 1200 dpi. In Table 11, m represents a number of the light beams, which is eight, entering each of the lenses, PLm represents a pitch of the main light rays of the multiple beams in the main scanning direction on the incident surface of each lens, V represents the refractive index profile of each lens, W [mm] represents an effective recording width of the photosensitive surface within which the light spots scan the photosensitive surface, and WLm represents an effective range of the lens in the main scanning direction corresponding to the effective recording width W.

TABLE 11

|  | S1 | S2 |
| --- | --- | --- |
| WLm | 122 mm | 192 mm |
| V | $1.84 \times 10^{-5}$ | $2.1 \times 10^{-5}$ |
| (m − 1) × PLm | 0.85 mm | 0.85 mm |
| (m − 1) × PLm × V/WLm | $0.128 \times 10^{-6}$ | $0.093 \times 10^{-6}$ |

As shown in FIG. 6, the value of (m−1)×PLm in Table 11 is a distance in the main scanning direction between centers of outermost two light spots. In the multi-beam scanning optical system 100, a deviation amount in the pitch between adjacent two light spots is restrained at a level smaller than 10%.

Next, a laser printer 200 according to the preferred embodiment of the present invention is explained with reference to FIG. 8. The laser printer 200 of FIG. 8 forms an image according to an electrophotographic method and includes a latent image carrying member 111 for carrying a latent image thereon, a charging roller 112 for charging the surface of the latent image carrying member 111, and a development unit 113 for developing the latent image with toner into a toner image. Further, the laser printer 200 includes a transfer roller 114 for transferring a toner image on a recording sheet, a cleaning unit 115 for cleaning residual toner on the latent image carrying member 111, a fixing unit 116 for fixing the toner image on the recording sheet, and the multi-beam scanning optical system 100 for scanning the surface of the latent image carrying member 11 with laser beams (LB) to record a latent image on the latent image carrying member 111. Further, the laser printer 200 includes a sheet cassette 118 for supplying the recording sheet into the laser printer 200, a pair of registration rollers 119 for transferring the recording sheet in synchronism with the rotation of the latent image carrying member 111, a pick up roller 120 for picking up a recording sheet from the sheet cassette 118, a sheet guide 121 for guiding the recording sheet, a pair of sheet ejection rollers 122 for ejecting the recording sheet, and a sheet output tray 123 for stacking the recording sheet therein.

The latent image carrying member 111 is a cylindrical photosensitive drum. The charging roller 112 may be replaced by a corona charging member. The multi-beam scanning optical system 100 emits laser beams to a surface of the latent image carrying member 111 between the charging roller 112 and the development unit 113 to record a latent image on the surface of the latent image carrying member 111.

Figure 8:
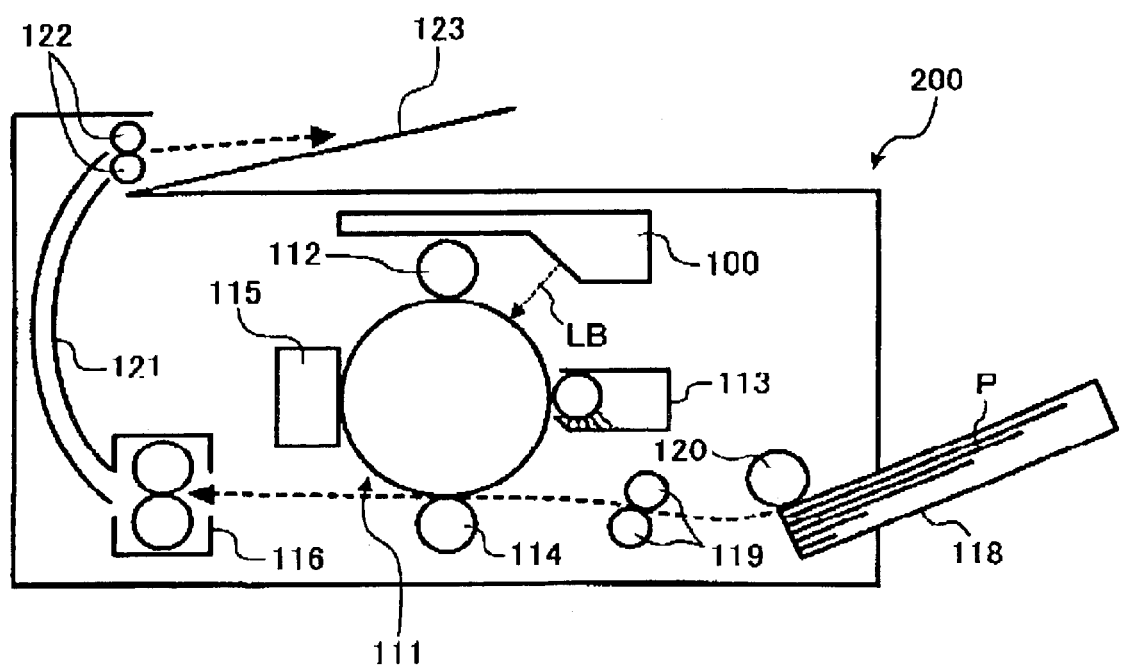
FIG. 8 is a laser printer having the multi-beam scanning optical system of FIG. 3.

To perform the image forming operation, the latent image carrying member 111 is rotated clockwise, as seen in FIG. 8, at a constant velocity so that the surface of the latent image carrying member 111 is evenly charged by the charging roller 112. The thus-moving surface of the latent image carrying member 111 is exposed to the laser beams emitted by the multi-beam scanning optical system 100 so that an electrostatic latent image is formed on the surface of the latent image carrying member 111. The electrostatic latent image is a negative latent image made by an exposure of an image area and is subjected to a reverse development by the development unit 113. In this way, a toner image is formed on the surface of the latent image carrying member 111.

The sheet cassette 118 containing recording sheets is detachably installed in the laser printer 200, and when the sheet cassette 118 is installed in the laser printer 200, as shown in FIG. 8, the pick-up roller 120 transfers an uppermost recording sheet from the sheet cassette 118 to the registration rollers 119. The registration rollers 119 transfer the recording sheet to a transfer area formed between the latent image carrying member 111 and the transfer roller 114 in synchronism with the movement of the toner image so that the recording sheet enters the transfer area when the toner image is moved to the transfer area.

Thereby, when the recording sheet is transported into the transfer area, the toner image carried on the latent image carrying member 111 is transferred onto the recording sheet by the transfer roller 114. After such image transfer, the recording sheet having the toner image is further moved to the fixing unit 116 and the toner image is fixed on the recording sheet by the fixing unit 116. Then, the recording sheet is transported to the sheet output tray 123 via the sheet guide 121 and the sheet ejection rollers 122.

After the image transfer by the transfer roller 114, the surface of the latent image carrying member 111 is cleaned by the cleaning unit 115 so that toner particles and dust particles depositing on the surface of the latent image carrying member 111 are removed therefrom.

In this way, the laser printer 200 forms a superior quality image by using the multi-beam scanning optical system 100.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2002-062197 filed on Mar. 7, 2002 in the Japanese Patent Office, the entire contents of which are incorporated by reference herein.

What is claimed is:

1. An optical scanning lens used in a multi-beam scanning optical apparatus that scans a recording surface with multiple scanning beams that form light spots running on the recording surface, the optical scanning lens comprising:

an incident surface configured to input said multiple scanning beams; and an output surface configured to output said multiple scanning beams to said recording surface, wherein
said optical scanning lens having an uneven refractive index profile, and satisfying a formula $(m-1) \times PLs \times V/WLs \leq 2.3 \times 10^{-6}$, where m is a number of light emission points of a light source providing light for forming said multiple scanning beams, PLs is a pitch of main light rays of the multiple scanning beams in a sub-scanning direction on the incident surface of the optical scanning lens, V represents the refractive index profile of the optical scanning lens, W [mm] represents an effective recording width of the recording surface, within which the light spots scan, and WLs represents an effective range of the optical scanning lens in a sub-scanning direction corresponding to the effective recording width W.

2. The optical scanning lens as defined in claim 1, wherein the refractive index profile V satisfies a formula $V \leq 15 \times 10^{-5}$.

3. An optical scanning lens used in a multi-beam scanning optical apparatus that scans a recording surface with multiple scanning beams that form light spots running on the recording surface, the optical scanning lens comprising:

an incident surface configured to input said multiple scanning beams; and an output surface configured to output said multiple scanning beams to said recording surface, wherein said lens having an uneven refractive index profile and satisfying a formula $(m-1) \times PLm \times V/WLm \leq 2.3 \times 10^{-6}$, where m is a number of the light emission points of a light source providing light for forming said multiple scanning beams, PLm is a pitch of main light rays of the multiple scanning beams in a main scanning direction on the incident surface of the optical scanning lens, V represents the refractive index profile of the optical scanning lens, W [mm] represents an effective recording width of the recording surface, within which the light spots scan, and WLm represents an effective range of the optical scanning lens in the main scanning direction corresponding to the effective recording width W.

4. The optical scanning lens as defined in claim 3, wherein the refractive index profile V satisfies a formula $V \leq 15 \times 10^{-5}$.

5. A multi-beam scanning optical apparatus, comprising:
a light source including a plurality of light emission points configured to emit light beams;
a first optical mechanism configured to reform the light beams into line images extending in a main scanning direction at an image focusing position;
a light deflecting mechanism configured to deflect the light beams to reform into multiple scanning beams with a plurality of deflective reflection surfaces in a vicinity to the image focusing position; and
a second optical mechanism configured to reform the multiple scanning beams deflected by the light deflecting mechanism into scanning light spots running on a scanning surface, said second optical mechanism comprising an optical scanning lens which has an uneven refractive index profile and satisfies a formula $(m-1) \times PLm \times V/WLm \leq 2.3 \times 10^{-6}$, wherein m is a number of the light emission points of the light source, PLm is a pitch of main light rays of the multiple beams in the main scanning direction on an incident surface of the optical scanning lens, V represents the refractive index profile of the optical scanning lens, W [mm] represents an effective recording width of a recording surface, within which the light spots scan, and WLm represents an effective range of the optical scanning lens in the main scanning direction corresponding to the effective recording width W.

6. The multi-beam scanning optical apparatus as defined in claim 5, wherein the refractive index profile V satisfies a formula $V \leq 15 \times 10^{-5}$.

7. A multi-beam scanning optical apparatus, comprising:
a light source including a plurality of light emission points at a predetermined pitch in a main scanning direction, and configured to emit light beams;
a first optical mechanism configured to reform the light beams into line images extending in a main scanning direction at an image focusing position;
a light deflecting mechanism configured to deflect the light beams to reform into multiple scanning beams with a plurality of deflective reflection surfaces in a vicinity to the image focusing position; and
a second optical mechanism configured to reform the multiple scanning beams deflected by the light deflecting mechanism into scanning light spots running on a scanning surface, said second optical mechanism comprising an optical scanning lens that has an uneven refractive index profile and satisfies a formula $(m-1) \times PLm \times V/WLm \leq 2.3 \times 10^{-6}$, wherein m is a number of the light emission points of the light source, PLm is a pitch of main light rays of the multiple beams in the main scanning direction on an incident surface of the optical scanning lens, V represents the refractive index profile of the optical scanning lens, W [mm] represents an effective recording width of a recording surface, within which the light spots scan, and WLm represents an effective range of the optical scanning lens in the main scanning direction corresponding to the effective recording width W.

8. The optical scanning lens as defined in claim 7, wherein the refractive index profile V satisfies a formula $V \leq 15 \times 10^{-5}$.

9. An image forming apparatus, comprising:

an image carrying member including a photosensitive surface serving as a latent image recording surface; and an optical scanning mechanism configured to perform an optical scanning relative to the photosensitive surface to form a latent image thereon, said optical scanning mechanism comprising:

a light source including a plurality of light emission points configured to emit light beams;

a first optical mechanism configured to reform the light beams into line images extending in a main scanning direction at an image focusing position;

a light deflecting mechanism configured to deflect the light beams to reform into multiple scanning beams with a plurality of deflective reflection surfaces in a vicinity to the image focusing position; and a second optical mechanism configured to reform the multiple scanning beams deflected by the light deflecting mechanism into scanning light spots running on the recording surface, said second optical mechanism comprising an optical scanning lens that has an uneven refractive index profile and satisfies a formula $(m-1) \times PLm \times V/WLm \leq 2.3 \times 10^{-6}$, wherein m is a number of the light emission points of the light source, PLm is a pitch of main light rays of the multiple beams in the main scanning direction on an incident surface of the optical scanning lens, V represents the refractive index profile of the optical scanning lens, W [mm] represents an effective recording width of the recording surface, within which the light spots scan the recording surface, and WLm represents an effective range of the optical scanning lens in the main scanning direction corresponding to the effective recording width W.

10. The image forming apparatus as defined in claim 9, wherein the refractive index profile V satisfies a formula $V \leq 15 \times 10^{-5}$.

11. An image forming apparatus, comprising:

an image carrying member including a photosensitive surface serving as a latent image recording surface; and an optical scanning mechanism configured to perform an optical scanning relative to the photosensitive surface to form a latent image thereon, said optical scanning mechanism comprising:

a light source including a plurality of light emission points at a predetermined pitch in a main scanning direction, and configured to emit light beams;

a first optical mechanism configured to reform the light beams into line images extending in a main scanning direction at an image focusing position;

a light deflecting mechanism configured to deflect the light beams to reform into multiple scanning beams with a plurality of deflective reflection surfaces in a vicinity to the image focusing position; and a second optical mechanism configured to reform the multiple scanning beams deflected by the light deflecting mechanism into scanning light spots running on the recording surface, said second optical mechanism comprising an optical scanning lens that has an uneven refractive index profile and satisfies a formula $(m-1) \times PLm \times V/WLm \leq 2.3 \times 10^{-6}$, wherein m is a number of the light emission points of the light source, PLm is a pitch of main light rays of the multiple beams in the main scanning direction on an incident surface of the optical scanning lens, V represents the refractive index profile of the optical scanning lens, W [mm] represents an effective recording width of the recording surface, within which the light spots scan the recording surface, and WLm represents an effective range of the optical scanning lens in the main scanning direction corresponding to the effective recording width W.

12. The image forming apparatus as defined in claim 11, wherein the refractive index profile V satisfies a formula $V \leq 15 \times 10^{-5}$.

* * * * *

UNITED STATES PATENT AND TRADEMARK OFFICE
CERTIFICATE OF CORRECTION

PATENT NO. : 6,856,438 B2 Page 1 of 1
APPLICATION NO. : 10/382489
DATED : February 15, 2005
INVENTOR(S) : Takanashi et al.

It is certified that error appears in the above-identified patent and that said Letters Patent is hereby corrected as shown below:

Col. 3, line 15, change "No. 11-04461" to -- No. 11-044641--.

Signed and Sealed this

Twenty-seventh Day of November, 2007

JON W. DUDAS
*Director of the United States Patent and Trademark Office*